(12) United States Patent
Li

(10) Patent No.: US 12,389,321 B2
(45) Date of Patent: Aug. 12, 2025

(54) METHOD FOR ASSISTANCE INFORMATION TRANSMISSION AND APPARATUS, TERMINAL, ACCESS NETWORK DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 427 days.

(21) Appl. No.: 17/756,174

(22) PCT Filed: Nov. 19, 2019

(86) PCT No.: PCT/CN2019/119477
§ 371 (c)(1),
(2) Date: May 18, 2022

(87) PCT Pub. No.: WO2021/097671
PCT Pub. Date: May 27, 2021

(65) Prior Publication Data
US 2023/0007583 A1    Jan. 5, 2023

(51) Int. Cl.
*H04W 52/02* (2009.01)
(52) U.S. Cl.
CPC ............... *H04W 52/0209* (2013.01)

(58) Field of Classification Search
CPC ............... H04W 52/0209; H04W 4/20; H04W 52/0235; H04W 76/27; Y02D 30/70
See application file for complete search history.

(56) References Cited

U.S. PATENT DOCUMENTS

2021/0051585 A1*  2/2021  Kim ................ H04W 76/28

FOREIGN PATENT DOCUMENTS

| CN | 107371152 A | 11/2017 |
|---|---|---|
| CN | 108353311 A | 7/2018 |
| CN | 109644396 A | 4/2019 |
| CN | 110049563 A | 7/2019 |
| CN | 110381543 A | 10/2019 |
| CN | 110418372 A | 11/2019 |
| WO | 2019022439 A1 | 1/2019 |
| WO | 2019056177 A1 | 3/2019 |

OTHER PUBLICATIONS

3GPP TS 38.331 V15.6.0 (Jun. 2019).*
3GPP TSG-RAN WG2 Meeting #107bis.*
"Low overhead signalling for UE overheating indication," Proceedings of the 3GPP TSG-RAN WG2 #99, R2-1708220, Huawei, HiSilicon, Aug. 21, 2017, Berlin, Germany, 4 pages.

(Continued)

*Primary Examiner* — Zhitong Chen
(74) *Attorney, Agent, or Firm* — McCoy Russell LLP

(57) ABSTRACT

A method for assistance information transmission includes: obtaining powersaving assistance information; and sending the powersaving assistance information through overheating assistance information.

14 Claims, 4 Drawing Sheets

(56) References Cited

OTHER PUBLICATIONS

"CR on signalling introduction of UE overheating support in NR SA scenario," Proceedings of the 3GPP TSG-RAN2 Meeting #104, R2-1819010, Huawei, HiSilicon, Nov. 12, 2018, Spokane, Washington, 19 pages.

"On Reusing Overheating Assistance Information for UE Power Saving," Proceedings of the 3GPP TSG-RAN WG2 Meeting #107bis, R2-1912458, Samsung, Oct. 14, 2019, Congqing, China, 2 pages.

"Summary of offline discussion 507 on UE assistance for SCell," Proceedings of the 3GPP TSG-RAN WG2 Meeting #107bis, R2-1914059, CATT, Oct. 14, 2019, Chongqing, P.R. China, 8 pages.

* cited by examiner

METHOD FOR ASSISTANCE INFORMATION TRANSMISSION AND APPARATUS, TERMINAL, ACCESS NETWORK DEVICE AND STORAGE MEDIUM

CROSS REFERENCE TO RELATED APPLICATION

The present application is a U.S. National Phase of International Application No. PCT/CN2019/119477 entitled "AUXILIARY INFORMATION TRANSMISSION METHOD AND APPARATUS, TERMINAL, ACCESS NETWORK DEVICE AND STORAGE MEDIUM," and filed on Nov. 19, 2019. The entire contents of the above-listed application is hereby incorporated by reference for all purposes.

TECHNICAL FIELD

The present disclosure relates to the technical field of communications, in particular to a method for assistance information transmission and apparatus, a terminal, an access network device and a storage medium.

BACKGROUND

A powersaving assistance message is introduced in a 5G R16 powersaving project. When a terminal is in a connected state, an access network device is requested through the powersaving assistance message to adjust transmission parameters between the terminal and the access network device, so as to achieve the purpose of powersaving.

SUMMARY

The present disclosure provide a method for assistance information transmission and apparatus, an access network device and a storage medium, which can reduce signaling overhead of assistance information transmission and save transmission resources. According to one aspect of the present disclosure, a method for assistance information transmission is provided, including:
  obtaining powersaving assistance information; and
  sending the powersaving assistance information through overheating assistance information.
According to one aspect of the present disclosure, a method for assistance information receiving is provided, including:
  receiving overheating assistance information carrying powersaving assistance information; and
  obtaining the powersaving assistance information from the overheating assistance information.
According to another aspect of the present disclosure, a terminal is provided, including: a processor; and a memory for storing an executable instruction of the processor, in which the processor is configured to load and execute the executable instruction so as to implement the aforementioned method for assistance information transmission.
According to another aspect of the present disclosure, an access network device is provided, including: a processor; and a memory for storing an executable instruction of the processor, in which the processor is configured to load and execute the executable instruction so as to implement the aforementioned assistance information receiving method.
According to another aspect of the present disclosure, a non-transitory computer readable storage medium is provided, and an instruction in the non-transitory computer readable storage medium, when executed by a processor, can execute the aforementioned method for assistance information transmission and method for assistance information receiving.

It should be understood that the above general description and the following detailed description are merely for example and explanatory, and are not intended to limit the present disclosure.

BRIEF DESCRIPTION OF THE DRAWINGS

The accompanying drawings here, which are incorporated in and constitute a part of this specification, illustrate examples consistent with the present disclosure and together with the specification serve to explain the principles of the present disclosure.

DETAILED DESCRIPTION

Examples will be described in detail here, and examples of which are illustrated in accompanying drawings. When the following description refers to the accompanying drawings, the same number in different accompanying drawings represents the same or similar elements unless otherwise indicated. The implementations described in the following examples do not represent all implementations consistent with the present disclosure. On the contrary, they are merely examples of an apparatus and a method consistent with some aspects of the present disclosure.

Figure 1:
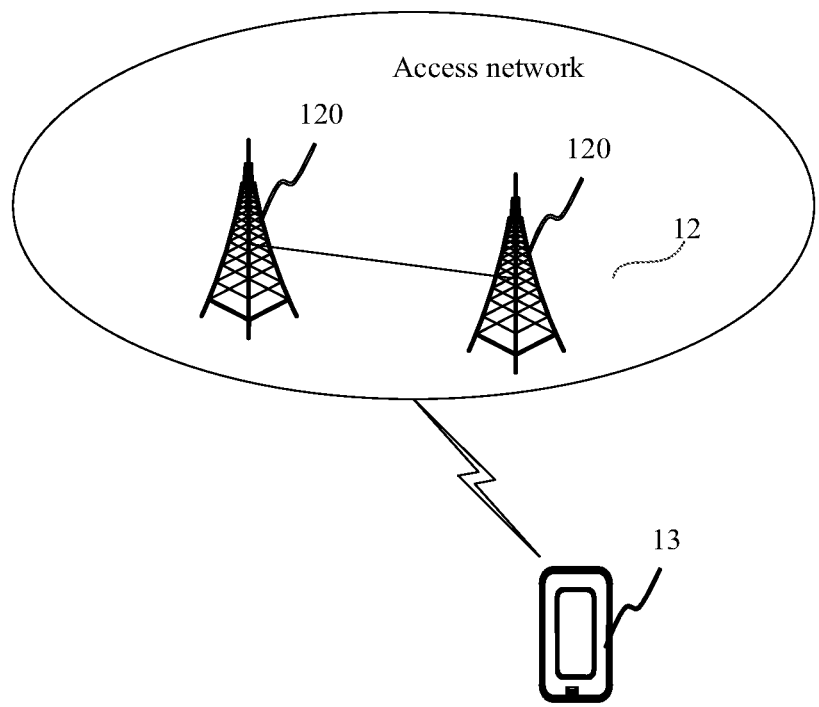
FIG. 1 is a schematic diagram of a network architecture provided by an example of the present invention.

FIG. 1 shows a block diagram of a communication system provided by an example of the present disclosure. As shown in FIG. 1, the communication system may include: an access network 12 and a terminal 13.

The access network 12 includes a plurality of access network devices 120. The access network device 120 may be a base station, and the base station is an apparatus deployed in the access network to provide a wireless communication function for the terminal. The base station may include various forms of macro base stations, micro base stations, relay stations, access points and so on. In systems using different wireless access technologies, names of devices with base station functions may be different. In a 5G New Radio (NR) system, the device is called gNodeB or gNB. With evolution of a communication technology, the name "base station" may be descriptive and will change. For the convenience of description, the above apparatuses for providing the wireless communication function for the terminal are collectively referred to as the access network device in the following.

The terminal 13 may include various handheld devices, vehicle-mounted devices, wearable devices and computing devices with wireless communication functions, or other processing devices connected to a wireless modem, as well as various forms of user equipment, mobile stations (MS), terminals and so on. For the convenience of description, the devices mentioned above are collectively referred to as the terminal. The access network device 120 and the terminal 13 communicate with each other through a certain air interface technology, such as a Uu interface.

Powersaving assistance message introduced in a 5G R16 powersaving project is also called assistance added in a secondary cell (SCell) (SCell Powersaving Assistance). A signaling structure of the powersaving assistance message follows a structure of existing overheating assistance information. The signaling structure of the overheating assistance information in a TR38.331 protocol is as follows:

sponding to the above fields by sending the above overheating assistance information, so as to realize cooling of the terminal. The overheating assistance information includes at least one field.

After terminal overheating relieving, the terminal sends the overheating assistance information to the access network device again. At this time, the overheating assistance information does not include any of the above fields, that is, the overheating assistance information carries a null field, and thus the access network device is informed that overheating has been relieved.

The communication system and a business scenario described by the example of the present disclosure are for the purpose of illustrating the technical solution of the example of the present disclosure more clearly, and do not constitute limitation to the technical solution provided by the example of the present disclosure. Those skilled in the art may know that with evolution of the communication system and occurrence of the new business scenario, the technical solution provided by the example of the present disclosure is also applicable for the similar technical problem.

```
    OverheatingAssistance ::=                          SEQUENCE {
        reducedMaxCCs                                      SEQUENCE {
        reducedCCsDL                                           INTEGER (0..31),
        reducedCCsUL                                           INTEGER (0..31)
                                       } OPTIONAL,
        reducedMaxBW-FR1                                   SEQUENCE {
                                reducedBW-FR1-DL
                             Reduced AggregatedBandwidth,
                                reducedBW-FR1-UL
                             Reduced AggregatedBandwidth
                                       } OPTIONAL,
        reducedMaxBW-FR2                                   SEQUENCE {
                                reducedBW-FR2-DL
                             Reduced AggregatedBandwidth,
                                reducedBW-FR2-UL
                             Reduced AggregatedBandwidth
                                       } OPTIONAL,
        reducedMaxMIMO-LayersFR1                           SEQUENCE {
        reducedMIMO-LayersFR1-DL                               MIMO-LayersDL,
        reducedMIMO-LayersFR1-UL                               MIMO-LayersUL
                                       } OPTIONAL,
        reducedMaxMIMO-LayersFR2                           SEQUENCE {
        reducedMIMO-LayersFR2-DL                               MIMO-LayersDL,
        reducedMIMO-LayersFR2-UL                               MIMO-LayersUL
                                       } OPTIONAL
                                                       }
    ReducedAggregatedBandwidth ::= ENUMERATED {mhz0, mhz10, mhz20, mhz30, mhz40,
    mhz50, mhz60, mhz80, mhz100, mhz200, mhz300, mhz400}//That is, a value of a bandwidth
                may be selected from the above fixed values;
                    TAG-UEASSISTANCEINFORMATION-STOP
                                 ASN1STOP
```

In the signaling structure, CCs refer to Component Carriers, BW is the Band Width, and FR is a Frequency Range. A range of FR1 is 450-6000 MHz, a range of FR2 is 24250-52600 MHz, MIMO-layers refer to a Multiple Input Multiple Output system layer number, DL is downlink (Download), and UL is uplink (Upload).

That is, the overheating assistance information includes the following optional fields:

a maximum component carrier number field, a maximum bandwidth field in a frequency range 1, a maximum bandwidth field in a frequency range 2, a multiple input multiple output system layer number field in the frequency range 1, or a multiple input multiple output system layer number field in the frequency range 2. Each field here further includes an uplink subfield and a downlink subfield.

In a case of overheating, the terminal requests the access network device to adjust transmission parameters corre- Examples of the present disclosure provide a method for assistance information transmission and apparatus, an access network device and a storage medium, which can reduce signaling overhead of assistance information transmission and save transmission resources. The technical solution is as follows.

Figure 2:
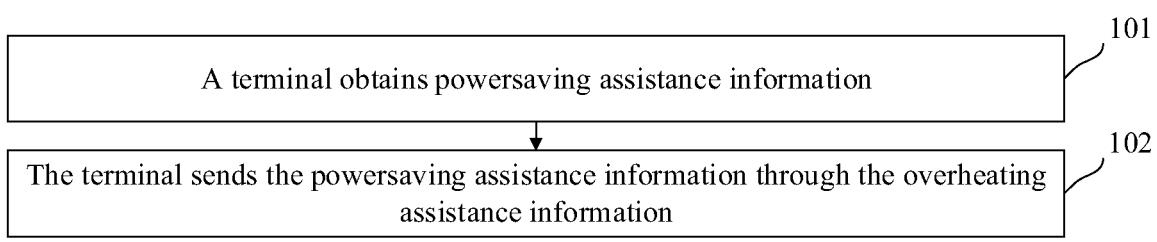
FIG. 2 is a flow diagram of a method for assistance information transmission shown according to an example.

FIG. 2 is a flow diagram of a method for assistance information transmission shown according to an example. Referring to FIG. 2, the method includes the following steps: in step 101, a terminal obtains powersaving assistance information.

The terminal may, in a connected state, determine the powersaving assistance information based on at least one of a type and amount of to-be-transmitted data. For example, if the amount of the to-be-transmitted data of the terminal is small, or the type of the to-be-transmitted data of the terminal is chat application data, an access network device may be requested to adjust transmission parameters, so as to make the terminal more powersaving.

Here, the powersaving assistance information determined by the terminal may have a plurality of parts, and the multiple parts correspond to various fields of overheating assistance information.

That is, the powersaving assistance information may include one or more of the following items: a maximum component carrier number, a maximum bandwidth in a frequency range 1, a maximum bandwidth in a frequency range 2, a multiple input multiple output system layer number in the frequency range 1, or a multiple input multiple output system layer number in the frequency range 2. Each item includes both an uplink part and a downlink part.

In step 102, the terminal sends the powersaving assistance information through the overheating assistance information.

The terminal sends the powersaving assistance information to the access network device, so that the access network device may adjust the transmission parameters based on the powersaving assistance information, so as to make the terminal more powersaving.

For example, the number of Scells currently activated by the terminal is 5, and the terminal may indicate in the powersaving assistance information to reduce the maximum component carrier number, so that the access network device can deactivate part of Scells, so as to reduce the number of Scells currently activated by the terminal to being less than 5, to achieve an effect of powersaving.

In the example of the present disclosure, the terminal sends the powersaving assistance information to the access network device through the overheating assistance information, so that the access network device may adjust the transmission parameters based on the powersaving assistance information, so as to make the terminal more powersaving. At the same time, the terminal transmits the powersaving assistance information by using the overheating assistance information, and does not need to send a powersaving assistance message separately, thus signaling overhead is reduced, and resource occupation is reduced.

In some examples, sending the powersaving assistance information through the overheating assistance information includes:
  the powersaving assistance information is sent through the overheating assistance information during terminal overheating relieving.

In the implementation, during overheating relieving, the terminal usually needs to send overheating assistance information carrying a null field to the access network device to inform the access network device that the terminal is in an overheating relieving state. Since the overheating assistance information carries the null field, at this time, the powersaving assistance information is sent by adopting the overheating assistance information, which does not affect transmission of the overheating assistance information and the powersaving assistance information, and saves transmission resources.

In some examples, the overheating assistance information includes at least one field, and the at least one field is configured to carry the powersaving assistance information.

In the signaling structure of the overheating assistance information, each field is an optional field. As previously mentioned, the powersaving assistance information includes at least one option. Since each option of the powersaving assistance information corresponds to the corresponding field of the overheating assistance information, after several options of the powersaving assistance information are determined, they are carried by correspondingly setting the field in the overheating assistance information.

In some examples, the overheating assistance information includes a first field, and the first field is any one of the at least one field; and information carried by the first field is overheating assistance information when a value of the first field is within a first range; and the information carried by the first field is powersaving assistance information when the value of the first field is within a second range.

In the example of the present disclosure, each field in the overheating assistance information may be divided into two ranges, a numerical value in one range corresponds to the overheating assistance information, and a numerical value in the other range corresponds to the powersaving assistance information. Thus the terminal and a base station may know whether each field carries the overheating assistance information or the powersaving assistance information, and the range of the value of each field may be divided.

In some examples, the method further includes:
  obtaining a relationship between a value range of the first field and a type of information carried by the first field; and
  generating the overheating assistance information based on the relationship between the value range of the first field and the type of the information carried by the first field.

In the step, it needs to obtain the above relationship first, then determine the value of each field according to whether to report the overheating assistance information or the powersaving assistance information, and then generate the overheating assistance information.

In some examples, obtaining the relationship between the value range of the first field and the type of the information carried by the first field includes: receiving the relationship between the value range of the first field and the type of the information carried by the first field sent by a server; or
  obtaining the relationship between the value range of the first field and the type of the information carried by the first field includes: obtaining the relationship between the value range of the first field and the type of the information carried by the first field from local storage.

In the implementation, the obtaining the relationship between the value range and the type of the carried information may include: obtaining from the server and obtaining from a locally stored protocol, in which the protocol is agreed upon by the server and the terminal.

In some examples, the overheating assistance information includes a custom field for indicating whether the overheating assistance information carries the powersaving assistance information.

For example, the overheating assistance information may indicate that the carried information is the powersaving assistance information by newly adding a bit. If the overheating assistance information does not have the bit, it indicates that the carried information is the overheating assistance information.

In some examples, the overheating assistance information includes at least one of the following fields: a maximum component carrier number field, a maximum bandwidth field in a frequency range 1, a maximum bandwidth field in a frequency range 2, a multiple input multiple output system layer number field in the frequency range 1, or a multiple input multiple output system layer number field in the frequency range 2.

In some examples, the method further includes:
  sending the powersaving assistance information through the overheating assistance information again.

In the implementation, the terminal may request the access network device to continuously adjust the transmission parameters by repeatedly sending the powersaving assistance information.

The fields contained in the overheating assistance information sent successively here may be different, so that the transmission parameters may be adjusted from different angles to achieve the purpose of powersaving.

In some examples, sending the powersaving assistance information through the overheating assistance information again includes:

setting a timer; and sending the powersaving assistance information through the overheating assistance information again when it is determined that time for sending the powersaving assistance information last time reaches a first time interval.

In the implementation, the sending of the powersaving assistance information needs timeout of the timer, so as to avoid resource waste caused by repeated sending of the powersaving assistance information.

It is worth noting that the aforementioned steps 101-102 and the above optional steps may be combined arbitrarily.

Figure 3:
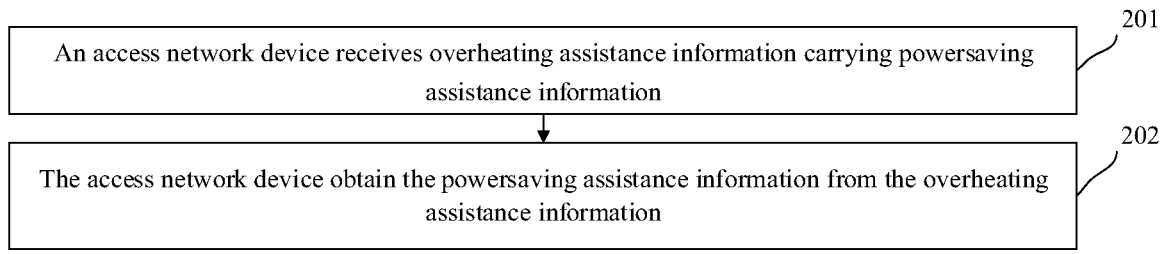
FIG. 3 is a flow diagram of a method for assistance information receiving shown according to an example.

FIG. 3 is a flow diagram of a method for assistance information receiving shown according to an example. Referring to FIG. 3, the method includes the following steps:

In step 201, an access network device receives overheating assistance information carrying powersaving assistance information.

Here, assistance information is determined by a terminal based on at least one of a type and amount of to-be-transmitted data, and reference may be made to step 101 for a determination mode.

In step 202, the access network device obtains the powersaving assistance information from the overheating assistance information.

The access network device may obtain the powersaving assistance information from the overheating assistance information, and then adjust transmission parameters based on the powersaving assistance information, so as to make the terminal more powersaving.

In the example of the present disclosure, by receiving the overheating assistance information carrying the powersaving assistance information and sent by the terminal, the access network device may adjust the transmission parameters based on the powersaving assistance information, so as to make the terminal more powersaving. At the same time, the terminal transmits the powersaving assistance information by using the overheating assistance information, and does not need to send a powersaving assistance message separately, thus signaling overhead is reduced, and resource occupation is reduced.

In some examples, the overheating assistance information includes at least one field, and the at least one field is configured to carry the powersaving assistance information.

In some examples, the overheating assistance information includes a first field, and the first field is any one of the at least one field; and information carried by the first field is overheating assistance information when a value of the first field is within a first range; and the information carried by the first field is powersaving assistance information when the value of the first field is within a second range.

In some examples, the method further includes:

a relationship between a value range of the first field and a type of information carried by the first field is sent to the terminal.

In some examples, the overheating assistance information includes a custom field for indicating whether the overheating assistance information carries the powersaving assistance information.

It is worth noting that the aforementioned steps 201-202 and the above optional steps may be combined arbitrarily.

Figure 4:
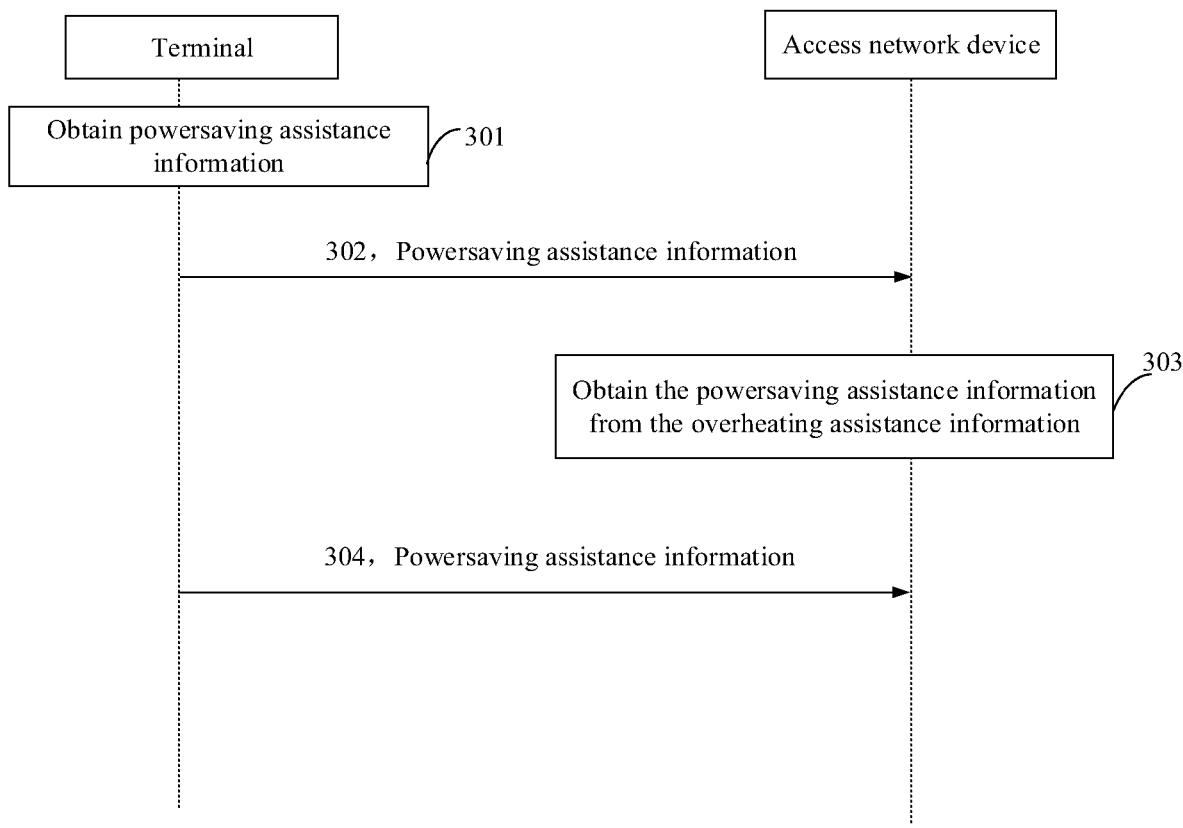
FIG. 4 is a flow diagram of a method for assistance information transmission shown according to an example.

FIG. 4 is a flow diagram of a method for assistance information transmission shown according to an example. Referring to FIG. 4, the method includes the following steps:

in step 301, a terminal obtains powersaving assistance information in a connected state.

Here, assistance information is determined by a terminal based on at least one of a type and amount of to-be-transmitted data, and reference may be made to step 101 for a determination mode.

In step 302, the terminal sends the powersaving assistance information through overheating assistance information. An access network device receives the overheating assistance information carrying the powersaving assistance information.

The step may include: the powersaving assistance information is sent through the overheating assistance information during terminal overheating relieving.

In the implementation, during overheating relieving, the terminal usually needs to send overheating assistance information carrying a null field to the access network device to inform the access network device that the terminal is in an overheating relieving state. Since the overheating assistance information carries the null field, at this time, the powersaving assistance information is sent by adopting the overheating assistance information, which does not affect transmission of the overheating assistance information and the powersaving assistance information, and saves transmission resources.

For example, the overheating assistance information includes at least one field, and the at least one field is configured to carry the powersaving assistance information.

In a signaling structure of the overheating assistance information, each field is an optional field. As previously mentioned, the powersaving assistance information includes at least one option. Since each option of the powersaving assistance information corresponds to the corresponding field of the overheating assistance information, after several options of the powersaving assistance information are determined, they are carried by correspondingly setting the field in the overheating assistance information.

In the example of the present disclosure, in order to make the terminal and a base station know whether each field carries the overheating assistance information or the powersaving assistance information, a range of a value of each field may be divided.

For example, the overheating assistance information includes a first field, and the first field is any one of the at least one field; and information carried by the first field is overheating assistance information when a value of the first field is within a first range; and the information carried by the first field is powersaving assistance information when the value of the first field is within a second range.

That is, in the example of the present disclosure, each field in the overheating assistance information may be divided into two ranges, a numerical value in one range corresponds to the overheating assistance information, and a numerical value in the other range corresponds to the powersaving assistance information.

For example, a maximum component carrier number field includes the two value ranges, the first range is greater than or equal to 3, the second range is greater than 0 and less than 3, and the value of the field is an integer. When the value of the maximum component carrier number field in the overheating assistance information is 1, the access network device determines that the overheating assistance information carries the powersaving assistance information, and at this time, the access network device may reduce a maximum component carrier number of the terminal according to a powersaving mode. When the value of the maximum component carrier number field in the overheating assistance information is 4, the access network device determines that the overheating assistance information carries the overheating assistance information, and at this time, the access network device may reduce the maximum component carrier number of the terminal according to an overheating mode.

Due to the above relationship, before sending the overheating assistance information by the terminal, the method further includes:

the terminal obtains a relationship between a value range of the first field and a type of information carried by the first field; and the terminal generates the overheating assistance information based on the relationship between the value range of the first field and the type of the information carried by the first field.

That is, in the step, it needs to obtain the above relationship first, then determine the value of each field according to whether to report the overheating assistance information or the powersaving assistance information, and then generate the overheating assistance information. When generating the overheating assistance information, the terminal first determines whether the overheating assistance information to be generated carries the powersaving assistance information or the overheating assistance information. If it is the powersaving assistance information, the value of the field that needs to be carried is taken from the range corresponding to the powersaving assistance information. If it is the overheating assistance information, the value of the field that needs to be carried is taken from the range corresponding to the overheating assistance information.

In some examples, obtaining, by the terminal, the relationship between the value range of the first field and the type of the information carried by the first field includes: the server sends the relationship between the value range of the first field and the type of the information carried by the first field to the terminal; and the terminal receives the relationship, sent by the server, between the value range of the first field and the type of the information carried by the first field; or obtaining, by the terminal, the relationship between the value range of the first field and the type of the information carried by the first field includes: the terminal obtains the relationship between the value range of the first field and the type of the information carried by the first field from local storage.

In the implementation, the obtaining the relationship between the value range and the type of the carried information may include: obtaining from the server and obtaining from a locally stored protocol, in which the protocol is agreed upon by the server and the terminal.

In addition to aforementioned identifying the type of the information carried by the overheating assistance information according to the value range of the field, another implementation is: the overheating assistance information includes a custom field for indicating whether the overheating assistance information carries the powersaving assistance information.

For example, the overheating assistance information may indicate that the carried information is the powersaving assistance information by newly adding a bit. If the overheating assistance information does not have the bit, it indicates that the carried information is the overheating assistance information.

In step 303, the access network device obtains the powersaving assistance information from the overheating assistance information.

The access network device may obtain the powersaving assistance information from the overheating assistance information, and then adjust transmission parameters based on the powersaving assistance information, so as to make the terminal more powersaving.

For example, the value of the maximum component carrier number field in the overheating assistance information is 1. At this time, the access network device determines that the overheating assistance information carries the powersaving assistance information based on the relationship between the value range and the type of the carried information, and then the network access device adjusts the transmission parameters according to the set mode, for example, deactivates one Scell.

For another example, the value of the maximum component carrier number field in the overheating assistance information is 4. At this time, the access network device determines that the overheating assistance information carries the overheating assistance information based on the relationship between the value range and the type of the carried information, and then the network access device adjusts the transmission parameters according to the set mode, for example, deactivates the plurality of Scells, so that the number of activated Scell is reduced to 3.

In addition, when the number of fields carried by the overheating assistance information is greater than 1, the access network device merely needs to determine whether the overheating assistance information or the powersaving assistance information is carried based on one of the fields, and after determination, the transmission parameters of each field carried are adjusted according to the type of the carried information.

In step 304, the terminal sends the powersaving assistance information through overheating assistance information again. The access network device receives the overheating assistance information carrying the powersaving assistance information and sent by the terminal.

In some examples, step 304 may include:

a timer is set. Here, the timer is reset after the powersaving assistance information is sent.

The powersaving assistance information is sent through the overheating assistance information again when it is determined that time for sending the powersaving assistance information last time reaches a first time interval.

In the implementation, the sending of the powersaving assistance information needs timeout of the timer, so as to avoid resource waste caused by repeated sending of the powersaving assistance information.

In the example of the present disclosure, the powersaving assistance information and the overheating assistance information may be respectively set with timers (also called Prohibit Timer), and both information sending needs timeout of the respective timers. Since the two kinds of information timers are independent of each other, the overheating assistance information may be adopted to alternately send the powersaving assistance information and the overheating assistance information.

Figure 5:
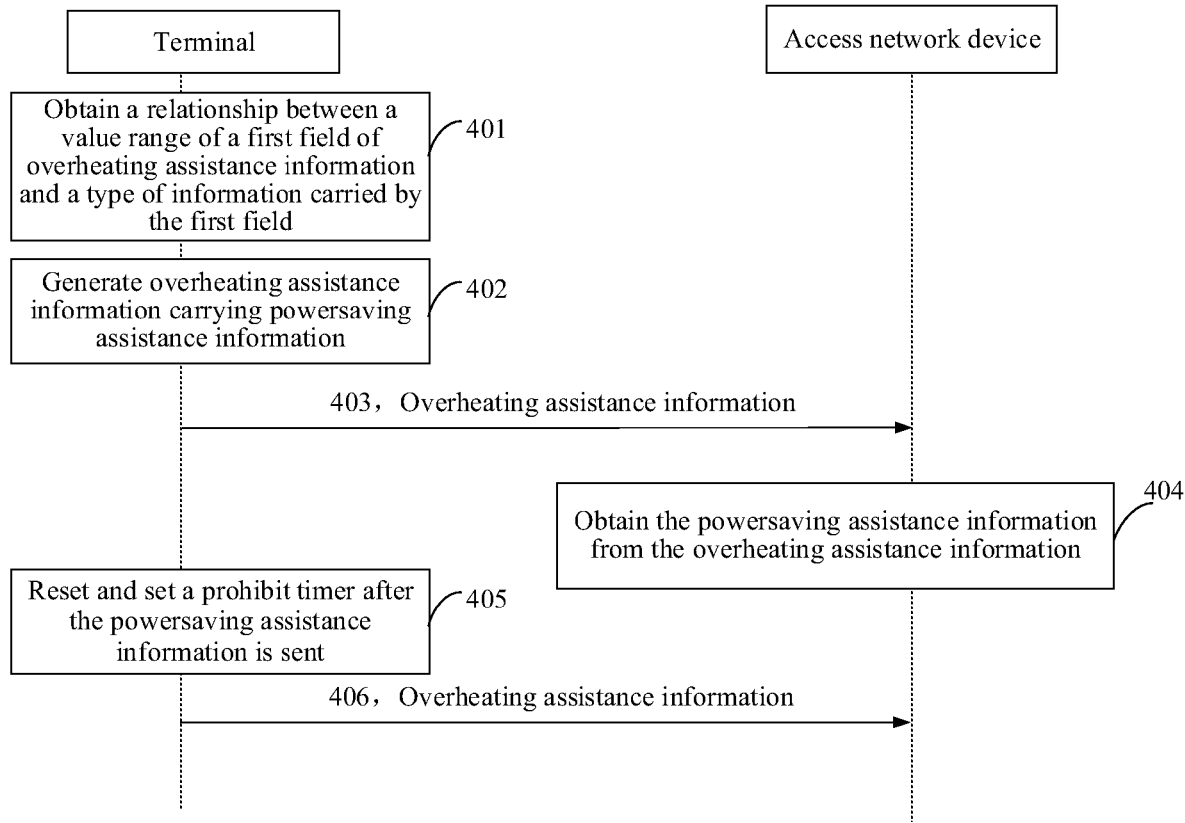
FIG. 5 is a flow diagram of a method for assistance information transmission shown according to an example.

FIG. 5 is a flow diagram of a method for assistance information transmission shown according to an example. Referring to FIG. 5, the method includes the following steps:

in step 401, a terminal obtains a relationship between a value range of a first field of overheating assistance information and a type of information carried by the first field.

In the example of the present disclosure, one field in the overheating assistance information may adopt a value range to indicate that the type of carried information is powersaving assistance information or overheating assistance information.

For example, the access network device may set the relationship between the value range and the type of the information of each field (a maximum component carrier number field, a maximum bandwidth field in a frequency range 1, a maximum bandwidth field in a frequency range 2, a multiple input multiple output system layer number field in the frequency range 1, and a multiple input multiple output system layer number field in the frequency range 2). Then, the access network device sends the relationship to the terminal. Alternatively, the access network device and the terminal may agree on a protocol, so that the terminal may obtain the above relationship from a local protocol.

For example, a threshold may be selected for each field, and the value range of the field is divided into two value ranges by the threshold. For example, a threshold of the maximum component carrier number field is 3, thus the maximum component carrier number field includes the two value ranges, a first range is greater than or equal to 3, and the corresponding information type is the overheating assistance information; and a second range is greater than 0 and less than 3, the corresponding information type is the powersaving assistance information, and the value of the field is an integer. When the value of the maximum component carrier number field is 1, the information type is the powersaving assistance information; and when the value of the maximum component carrier number field is 4, the information type is the overheating assistance information.

Here, for the field of the overheating assistance information, reference may be made to the description of step 302.

In other implementations, the aforementioned mode of segmenting the value range may not be used to distinguish the types of the carried information. A custom field may also be added to the overheating assistance information to indicate the type of information. The custom field may be 1 bit. For example, the overheating assistance information may indicate that the carried information is the powersaving assistance information by newly adding a bit. If the overheating assistance information does not have the bit, it indicates that the carried information is the overheating assistance information.

In step 402, during overheating relieving, the terminal adds the powersaving assistance information to the overheating assistance information based on the relationship between the value range of the first field and the type of the information carried by the first field to generate the overheating assistance information carrying the powersaving assistance information.

Because during overheating relieving, the terminal usually needs to send one overheating assistance information carrying a null field to the access network device to inform the access network device that the terminal is in an overheating relieving state. Since the overheating assistance information carries the null field, at this time, the powersaving assistance information may be added into the overheating assistance information, and the powersaving assistance information is sent by using the overheating assistance.

In step 403, the terminal sends the overheating assistance information. The access network device receives the overheating assistance information.

In step 404, the access network device obtains the powersaving assistance information from the overheating assistance information.

The access network device may obtain the powersaving assistance information from the overheating assistance information, and then adjust transmission parameters based on the powersaving assistance information, so as to make the terminal more powersaving.

In step 405, the terminal resets and sets a prohibit timer after the powersaving assistance information is sent.

In step 406, the terminal sends the powersaving assistance information through the overheating assistance information again after timeout of the timer. The access network device receives the overheating assistance information carrying the powersaving assistance information and sent by the terminal.

Here, if the prohibit timer times out, from current time to time of sending the powersaving assistance information last time reaches a first time interval, and the powersaving assistance information may be resent at this time. If the prohibit timer does not time out, the powersaving assistance information cannot be resent.

Figure 6:
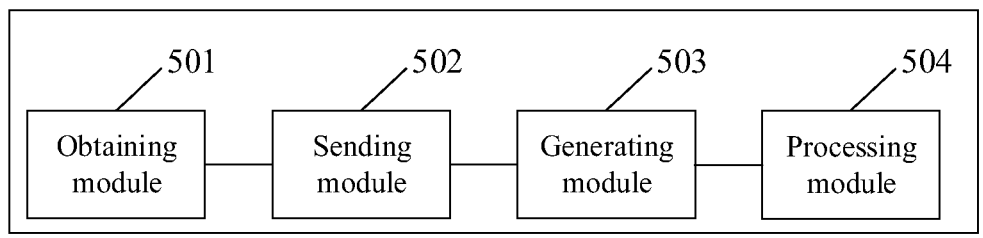
FIG. 6 is a schematic structural diagram of an apparatus for assistance information transmission shown according to an example.

FIG. 6 is a schematic structural diagram of an apparatus for assistance information transmission shown according to an example. The apparatus has functions of a terminal for realizing the above method example, and the function may be realized by hardware, or may be realized by executing corresponding software through hardware. As shown in FIG. 6, the apparatus includes: an obtaining module 501 and a sending module 502.

The obtaining module 501 is configured to obtain powersaving assistance information; and the sending module 502 is configured to send the powersaving assistance information through overheating assistance information.

In some examples, the sending module 502 is configured to send the powersaving assistance information through the overheating assistance information during terminal overheating relieving.

In some examples, the overheating assistance information includes at least one field, and the at least one field is configured to carry the powersaving assistance information.

In some examples, the overheating assistance information includes a first field, and the first field is any one of the at least one field; and information carried by the first field is overheating assistance information when a value of the first field is within a first range; and the information carried by the first field is powersaving assistance information when the value of the first field is within a second range.

In some examples, the obtaining module 501 is further configured to obtain a relationship between a value range of the first field and a type of information carried by the first field; and the apparatus further includes:

a generating module 503, configured to generate the overheating assistance information based on the relationship between the value range of the first field and the type of the information carried by the first field.

In some examples, the obtaining module 501 is further configured to receive the relationship between the value range of the first field and the type of the information carried by the first field sent by a server; or the obtaining module 501 is further configured to obtain the relationship between the value range of the first field and the type of the information carried by the first field from local storage.

In some examples, the overheating assistance information includes a custom field for indicating whether the overheating assistance information carries the powersaving assistance information.

In some examples, the overheating assistance information includes at least one of the following fields: a maximum component carrier number field, a maximum bandwidth field in a frequency range 1, a maximum bandwidth field in a frequency range 2, a multiple input multiple output system layer number field in the frequency range 1, or a multiple input multiple output system layer number field in the frequency range 2.

In some examples, the sending module 502 is further configured to send the powersaving assistance information through the overheating assistance information again.

In some examples, the apparatus further includes:
a processing module 504, configured to set a timer; and
the sending module 502, configured to send the powersaving assistance information through the overheating assistance information again when it is determined that time for sending the powersaving assistance information last time reaches a first time interval.

Figure 7:
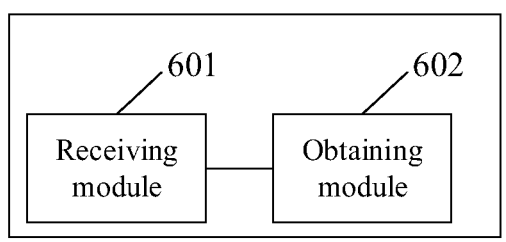
FIG. 7 is a schematic structural diagram of an apparatus for assistance information receiving shown according to an example.

FIG. 7 is a schematic structural diagram of an apparatus for assistance information receiving shown according to an example. The apparatus has functions of an access network device for realizing the above method example, and the function may be realized by hardware, or may be realized by executing corresponding software through hardware. As shown in FIG. 7, the apparatus includes: a receiving module 601 and an obtaining module 602.

The receiving module 601 is configured to receive overheating assistance information carrying powersaving assistance information; and the obtaining module 602 is configured to obtain the powersaving assistance information from the overheating assistance information.

In some examples, the overheating assistance information includes at least one field, and the at least one field is configured to carry the powersaving assistance information.

In some examples, the overheating assistance information includes a first field, and the first field is any one of the at least one field; and
information carried by the first field is overheating assistance information when a value of the first field is within a first range; and the information carried by the first field is powersaving assistance information when the value of the first field is within a second range.

In some examples, the receiving module 601 is further configured to send a relationship between a value range of the first field and a type of information carried by the first field to a terminal.

In some examples, the overheating assistance information includes a custom field for indicating whether the overheating assistance information carries the powersaving assistance information.

Figure 8:
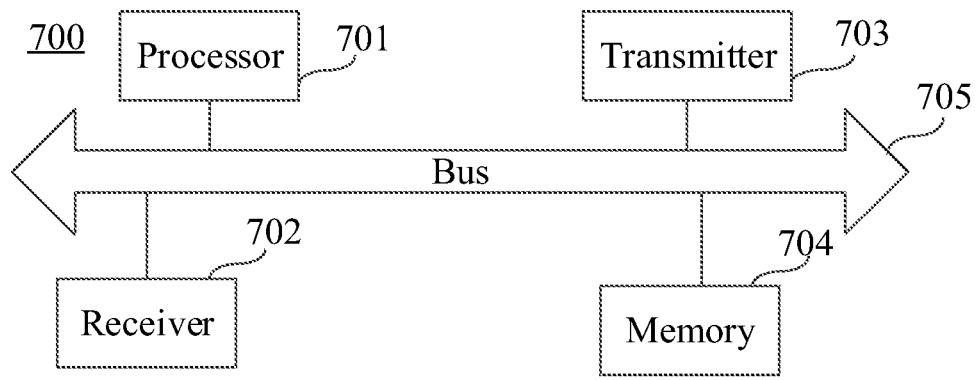
FIG. 8 is a block diagram of a terminal shown according to an example.

FIG. 8 is a block diagram of a terminal 700 shown according to an example. The terminal 700 may include: a processor 701, a receiver 702, a transmitter 703, a memory 704 and a bus 705.

The processor 701 includes one or more processing cores, and the processor 701 executes various functional applications and information processing by running software programs and modules.

The receiver 702 and the transmitter 703 may be implemented as one communication component, which may be a communication chip.

The memory 704 is connected with the processor 701 through the bus 705.

The memory 704 may be configured to store at least one instruction, and the processor 701 is configured to execute the at least one instruction, so as to implement various steps in the above method examples.

Additionally, the memory 704 may be any type of volatile or nonvolatile storage devices or their combinations, and the volatile or nonvolatile storage devices include but not limited to: a magnetic disk or an optical disk, an electrically erasable programmable read only memory (EEPROM), an erasable programmable read only memory (EPROM), a static anytime access memory (SRAM), a read only memory (ROM), a magnetic memory, a flash memory, and a programmable read only memory (PROM).

In an example, a non-transitory computer readable storage medium is further provided. The non-transitory computer readable storage medium stores at least one instruction, at least one program, a code set or an instruction set. The at least one instruction, the at least one program, the code set or the instruction set is loaded and executed by a processor to implement the method for assistance information transmission provided by each of the above method examples.

Figure 9:
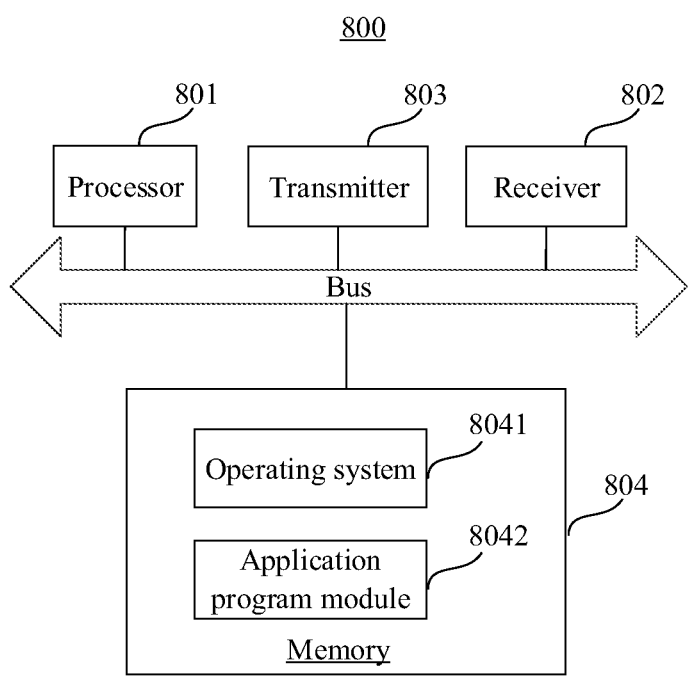
FIG. 9 is a block diagram of an access network device shown according to an example.

FIG. 9 is a block diagram of an access network device 800 shown according to an example. The access network device 800 may include: a processor 801, a receiver 802, a transmitter 803 and a memory 804. The receiver 802, the transmitter 803 and the memory 804 are respectively connected with the processor 801 through a bus.

The processor 801 includes one or more processing cores, and the processor 801 executes the method executed by the access network device in the method for assistance information receiving provided by the example of the present disclosure by running software programs and modules. The memory 804 may be configured to store the software programs and the modules. Specifically, the memory 804 may store an operating system 8041 and an application program module 8042 needed for at least one function. The receiver 802 is configured to receive communication data sent by other devices, and the transmitter 803 is configured to send the communication data to other devices.

In an example, a non-transitory computer readable storage medium is further provided. The non-transitory computer readable storage medium stores at least one instruction, at least one program, a code set or an instruction set. The at least one instruction, the at least one program, the code set or the instruction set is loaded and executed by a processor to implement the method for assistance information receiving provided by each of the above method examples.

An example of the present disclosure further provides an assistance information reporting system. The powersaving assistance information reporting system includes a terminal and an access network device. The terminal is the terminal provided by the example shown in FIG. 8. The access network device is the access network device provided by the example shown in FIG. 9.

In the example of the present disclosure, a desired state of the terminal is determined in an inactive state, and then sends the determined desired state to the access network device, so that the access network device can take into account the desired state of the terminal when subsequently managing an RRC connected state of the terminal, the management of the access network device for the RRC connected state of the terminal can be more in line with expectation of the terminal, thus information transmission needed by frequent switching of the RRC connected state is reduced, and resource occupation is reduced.

Those of skill in the art will easily figure out other implementation solutions of the present disclosure after considering the specification and practicing the invention disclosed here. The present application intends to cover any transformation, usage or adaptive change of the present disclosure, and these transformations, usages or adaptive changes conform to a general principle of the present disclosure and include common general knowledge or conventional technical means in the technical field not disclosed by the present disclosure. The specification and the examples are merely regarded as being for example.

It will be appreciated that the present disclosure is not limited to the exact structure that has been described above and shown in the accompanying drawings, and that various modifications and changes may be made without departing from the scope of the present disclosure.

Additional non-limiting examples of the disclosure include:

1. A method for assistance information transmission, including:
   obtaining powersaving assistance information; and
   sending the powersaving assistance information through overheating assistance information.
2. The method according to example 1, where sending the powersaving assistance information through the overheating assistance information includes:
   sending the powersaving assistance information through the overheating assistance information during terminal overheating relieving.
3. The method according to examples 1 or 2, where the overheating assistance information includes at least one field, and the at least one field is configured to carry the powersaving assistance information.
4. The method according to example 3, where the overheating assistance information includes a first field, and the first field is any one of the at least one field; and
   information carried by the first field is overheating assistance information when a value of the first field is within a first range; and the information carried by the first field is powersaving assistance information when the value of the first field is within a second range.
5. The method according to example 4, further including:
   obtaining a relationship between a value range of the first field and a type of information carried by the first field; and
   generating the overheating assistance information based on the relationship between the value range of the first field and the type of the information carried by the first field.
6. The method according to example 5, where obtaining the relationship between the value range of the first field and the type of the information carried by the first field includes:
   receiving the relationship between the value range of the first field and the type of the information carried by the first field sent by a server; or
   obtaining the relationship between the value range of the first field and the type of the information carried by the first field from local storage.
7. The method according to any one of examples 1-6, where the overheating assistance information includes a custom field for indicating whether the overheating assistance information carries the powersaving assistance information.
8. The method according to any one of examples 3-6, where the overheating assistance information includes at least one of the following fields:
   a maximum component carrier number field, a maximum bandwidth field in a frequency range 1, a maximum bandwidth field in a frequency range 2, a multiple input multiple output system layer number field in the frequency range 1, or a multiple input multiple output system layer number field in the frequency range 2.
9. A method for assistance information receiving, including:
   receiving overheating assistance information carrying powersaving assistance information; and
   obtaining the powersaving assistance information from the overheating assistance information.
10. The method according to example 9, where the overheating assistance information includes at least one field, and the at least one field is configured to carry the powersaving assistance information.
11. The method according to example 10, where the overheating assistance information includes a first field, and the first field is any one of the at least one field; and
    information carried by the first field is overheating assistance information when a value of the first field is within a first range; and the information carried by the first field is powersaving assistance information when the value of the first field is within a second range.
12. The method according to example 11, further including:
    sending a relationship between a value range of the first field and a type of information carried by the first field to a terminal.
13. The method according to any one of examples 9-12, where the overheating assistance information includes a custom field for indicating whether the overheating assistance information carries the powersaving assistance information.
14. An apparatus for assistance information transmission, including:
    an obtaining module, configured to obtain powersaving assistance information; and
    a sending module, configured to send the powersaving assistance information through overheating assistance information.
15. An apparatus for assistance information receiving, including:
    a receiving module, configured to receive overheating assistance information carrying powersaving assistance information; and
    an obtaining module, configured to obtain the powersaving assistance information from the overheating assistance information.
16. A terminal, including:
    a processor; and
    a memory for storing an executable instruction of the processor; where
    the processor is configured to load and execute the executable instruction so as to implement the method for assistance information transmission according to any one of examples 1-8.
17. An access network device, including:
    a processor; and
    a memory for storing an executable instruction of the processor; where the processor is configured to load and execute the executable instruction so as to implement the method for assistance information receiving according to any one of examples 9-13.

18. A non-transitory computer readable storage medium, where in response to that an instruction in the non-transitory computer readable storage medium is executed by a processor, the method for assistance information transmission according to any one of examples 1-8 can be executed, or the method for assistance information receiving according to any one of examples 9-13 can be executed.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for assistance information transmission, comprising:
   obtaining, by a terminal, powersaving assistance information; and
   sending, by the terminal, the powersaving assistance information through overheating assistance information;
   wherein the overheating assistance information comprises at least one field, the at least one field is configured to carry the powersaving assistance information, and the at least one field comprises at least one of the following: a maximum component carrier number field, a maximum bandwidth field in a frequency range 1, a maximum bandwidth field in a frequency range 2, a multiple input multiple output system layer number field in the frequency range 1, or a multiple input multiple output system layer number field in the frequency range 2;
   wherein the overheating assistance information comprises a first field, and the first field is any one of the at least one field and is configured with a threshold by which a value range of the first field is divided into a first range and a second range; and
   wherein information carried by the first field is the overheating assistance information when a value of the first field is within the first range, and the information carried by the first field is the powersaving assistance information when the value of the first field is within the second range.

2. The method according to claim 1, wherein sending the powersaving assistance information through the overheating assistance information comprises:
   sending the powersaving assistance information through the overheating assistance information during terminal overheating relieving.

3. The method according to claim 1, further comprising:
   obtaining a relationship between the value range of the first field and a type of information carried by the first field; and
   generating the overheating assistance information based on the relationship between the value range of the first field and the type of the information carried by the first field.

4. The method according to claim 3, wherein obtaining the relationship between the value range of the first field and the type of the information carried by the first field comprises
   receiving the relationship between the value range of the first field and the type of the information carried by the first field sent by a server.

5. The method according to claim 3, wherein obtaining the relationship between the value range of the first field and the type of the information carried by the first field comprises:
   obtaining the relationship between the value range of the first field and the type of the information carried by the first field from local storage.

6. The method according to claim 1, wherein the overheating assistance information comprises a custom field for indicating whether the overheating assistance information carries the powersaving assistance information.

7. A non-transitory computer readable storage medium,
   wherein in response to that an instruction in the non-transitory computer readable storage medium is executed by a processor, execute method for assistance information transmission according to claim 1.

8. A method for assistance information receiving, comprising:
   receiving, by an access network device, overheating assistance information carrying powersaving assistance information; and
   obtaining, by the access network device, the powersaving assistance information from the overheating assistance information;
   wherein the overheating assistance information comprises at least one field, the at least one field is configured to carry the powersaving assistance information, and the at least one field comprises at least one of the following: a maximum component carrier number field, a maximum bandwidth field in a frequency range 1, a maximum bandwidth field in a frequency range 2, a multiple input multiple output system layer number field in the frequency range 1, or a multiple input multiple output system layer number field in the frequency range 2;
   wherein the overheating assistance information comprises a first field, and the first field is any one of the at least one field and is configured with a threshold by which a value range of the first field is divided into a first range and a second range; and
   wherein information carried by the first field is the overheating assistance information when a value of the first field is within the first range, and the information carried by the first field is the powersaving assistance information when the value of the first field is within the second range.

9. The method according to claim 8, further comprising:
   sending a relationship between the value range of the first field and a type of information carried by the first field to a terminal.

10. The method according to claim 8, wherein the overheating assistance information comprises a custom field for indicating whether the overheating assistance information carries the powersaving assistance information.

11. An access network device, comprising:
    a processor; and
    a memory for storing an executable instruction of the processor; wherein the processor is configured to load and execute the executable instruction so as to implement the method for assistance information receiving according to claim 8.

12. A non-transitory computer readable storage medium, wherein in response to that an instruction in the non-transitory computer readable storage medium is executed by a processor, execute method for assistance information receiving according to claim 8.

13. A terminal, comprising:
- a processor; and
- a memory for storing an executable instruction of the processor; wherein
- the processor is configured to load and execute the executable instruction so as to:
  - obtain powersaving assistance information; and
  - send the powersaving assistance information through overheating assistance information;
- wherein the overheating assistance information comprises at least one field, the at least one field is configured to carry the powersaving assistance information, and the at least one field comprises at least one of the following: a maximum component carrier number field, a maximum bandwidth field in a frequency range 1, a maximum bandwidth field in a frequency range 2, a multiple input multiple output system layer number field in the frequency range 1, or a multiple input multiple output system layer number field in the frequency range 2;
- wherein the overheating assistance information comprises a first field, and the first field is any one of the at least one field and is configured with a threshold by which a value range of the first field is divided into a first range and a second range; and
- wherein information carried by the first field is the overheating assistance information when a value of the first field is within the first range, and the information carried by the first field is the powersaving assistance information when the value of the first field is within the second range.

14. The terminal according to claim 13, wherein the processor is configured to load and execute the executable instruction so as to:
- send the powersaving assistance information through the overheating assistance information during terminal overheating relieving.

* * * * *